Patented June 23, 1953

UNITED STATES PATENT OFFICE 2,643,247

2,643,247

SYNTHETIC RUBBERLIKE MATERIALS FROM AN ALKYL ACRYLATE AND AN ALIPHATIC DIENE HYDROCARBON

Charles H. Fisher, Abington, and William C. Mast, Philadelphia, Pa., assignors to the United States of America as represented by the Secretary of Agriculture No Drawing. Original application May 25, 1945, Serial No. 595,866. Divided and this application April 4, 1952, Serial No. 281,449

3 Claims. (Cl. 260—79.5)

(Granted under Title 35, U. S. Code (1952), sec. 266)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a division of our copending application for patent, Serial No. 595,866, filed May 25, 1945, which in turn is a continuation-in-part of application bearing Serial No. 560,585, filed October 27, 1944, both applications having been abandoned.

Our invention relates to synthetic rubbers prepared from alkyl acrylates and their polymers and copolymers.

It is known that the polymers of methyl acrylate, ethyl acrylate, and other normal alkyl acrylates are soft and flexible. Furthermore, it is known that useful, flexible materials can be made by blending alkyl acrylate polymers with certain other materials or by incorporating fillers and pigments into them. The resulting products, however, lack some of the desirable characteristics found in rubber and certain synthetic rubbers, and several unsuccessful attempts have been made to transform the flexible alkyl acrylate polymers into true synthetic rubbers. Vulcanization does not occur when polymers, such as polymethyl acrylate and polyethyl acrylate, are heated with sulfur. We have attempted vulcanization by heating alkyl acrylate polymers containing sulfur and mixtures of such polymers, sulfur, carbon black, and some of the standard accelerators without successful results. No appreciable change is brought about by heating such mixtures, and the products lack many of the desirable properties found in vulcanized rubber and vulcanized synthetic rubbers.

An object of this invention, accordingly, is to produce vulcanized alkyl acrylate polymers having enhanced rubberlike properties and capable of being used in place of rubber.

Another object of the invention is to prepare alkyl acrylate polymers which can be compounded and milled on standard rubber rolls and equipment and cured or vulcanized in standard rubber molds to give vulcanized synthetic rubbers.

A further object is to produce synthetic rubbers which have greater resistance to light, heat, oils, oxidation, and aging than natural rubber and some of the previously described synthetic rubbers.

A further object is to provide synthetic rubbers which can be made from carbohydrates, an abundant and reproducible raw material.

A further object is to provide methods for copolymerizing methyl acrylate, ethyl acrylate and similar alkyl acrylates, particularly methods of polymerization which permit linear growth but prevent or retard cross-linkage, thus giving polymers having olefinic unsaturation available for vulcanization.

Other objects and advantages of our invention will appear from the following description.

We have found that synthetic rubbers can be made by copolymerizing methyl acrylate and other alkyl acrylates with small proportions of various aliphatic polyolefinic hydrocarbons, particularly aliphatic dienic hydrocarbons, piperylene being preferred. Other such dienic hydrocarbons which may be used include butadiene, dimethylbutadiene, isoprene, pentadiene, methylpentadiene, limonene, cyclopentadiene, and vinylcyclohexene. Other polyolefinic hydrocarbons which may be employed include trienes such as myrcene and allo-ocimene. Substituted butadienes such as acetoxybutadiene, alkoxybutadiene, cyanobutadiene, and chloroprene may also be used. The polymerization is effected by heating a mixture containing, as monomeric components, the alkyl acrylate and the aliphatic dienic hydrocarbon in the proportion, by weight, of at least 80 percent of the acrylate to at least 1 percent of the dienic hydrocarbon. The resulting copolymer is then compounded with a vulcanizing agent, sulfur being preferred, and desirably with other materials such as carbon black, various vulcanization accelerators, and so forth, commonly used in the natural and the synthetic rubber industries in vulcanizing processes, and the compounded mixture then heated to effect vulcanization, under the general conditions commonly used to vulcanize natural or synthetic rubbers. Moreover, we have found that cross-linkage can be prevented or retarded during the polymerization by the presence of polymerization regulators, such as certain mercaptans or acrylonitrile or both, the use of dodecyl mercaptan and acrylonitrile being particularly satisfactory. Other polymerization regulators, such as carbon tetrachloride, hexachloroethane, xanthogen disulfide, and trichloropropionitrile, can be used to prevent or minimize cross-linkage. We have found also that the aforementioned polyolefinic hydrocarbons can be copolymerized with simple alkyl acrylates, using emulsion, mass, or solution polymerization methods to give vulcanizable copolymers. Acrylonitrile and other polymerization regulators may be used in these polymerizations, but synthetic rubbers may be prepared in many instances without their use.

We have found further that these unsaturated copolymers can be blended with other synthetic organic polymers and copolymers like isobutylene-isoprene copolymer, isobutylene-butadiene copolymer, isobutylene copolymers containing unsaturation, alkyd resins, alkyd resins containing olefinic linkages, condensation polymers of glycols and dibasic acids, polyvinyl acetate, and vinyl chloride-vinyl acetate copolymers, etc., and the resulting blend then vulcanized to obtain rubberlike products.

Emulsion polymerization was used in most instances to prepare the copolymers, while some of the copolymers were made by solution and mass polymerization. With the exception of Example 6 of Table I, a closed vessel was used to prepare the butadiene copolymers because of the high vapor pressure of this diene.

When methyl acrylate was polymerized with small proportions of butadiene in the absence of acrylonitrile or polymerization regulatory, a hard and tough product sometimes resulted. When acrylonitrile or polymerization regulators, a hard mers were soft and rubbery, as shown in Table I.

Data on several emulsion polymerizations and one mass polymerization are given in Table II and the vulcanization and curing data of these polymers are shown in Table III.

In Tables IV and VI, the polymerization data shown therein was obtained using an emulsion method throughout for the sake of convenience, although mass or solution methods could also be used. The polymerizations in these cases were carried out in round-bottomed, three-necked glass flasks fitted with a thermometer well reflux condenser, and a water-sealed stirrer (ground-glass joints). The stirrers were paddle, anchor, or half-moon type and were rotated at about from 75 to 150 R. P. M. The monomer mixture was added to water and an emulsifying agent in the flask, stirred, and heated to about refluxing temperature. The desired amount of catalyst was then added, either all at once or in several portions. Heating was applied if necessary to maintain gentle refluxing and the course of the polymerization was followed by noting changes in the refluxing temperature. When refluxing ceased in spite of heating (usually at about 92° C.) the polymerization was finished. The emulsion was then poured into a beaker, coagulated by the addition of a dilute solution of sodium chloride, washed with water, and dried. Additional details are given in the tables.

In the vulcanization, the compounding ingredients, listed in Tables III, V, and VII, which comprise a mixture of a vulcanizing agent, such as sulfur, quinone dioxime, dibenzoate of quinone dioxime; a vulcanizing accelerator such as mercaptobenzothiazole tetramethylthiuram disulfide, coated calcium carbonate, N-cyclohexyl-2-benzothiazole sulfenamide, the reaction product of carbon disulfide and methylene-dipiperidine, selenium diethyldithiocarbamate, zinc dibutyl-dithiocarbamate, and purified mercaptobenzothiazole; an accelerator activator, such as stearic acid; and a reinforcing agent, such as carbon black, red lead, iron oxide, zinc oxide, litharge, calcium carbonate, calcium sulfate, calcium silicate, magnesium oxide, titanium dioxide, and aluminum oxide were milled into the copolymers on a standard rubber mill which had steam-heated rolls. The polymers were tacky and required little or no breakdown before forming a rolling bank. Large amounts of carbon black could be milled into the copolymers. The compounded mixtures were cured and tested with equipment and techniques used in the rubber and synthetic rubber industries. The vulcanized products were soft, flexible, elastic and rubberlike in appearance and feel. Some of the vulcanized products had tensile strengths up to 2100 pounds per square inch. The vulcanized products were insoluble in hydrocarbon solvents and in water, and were resistant to oxygen, light, aging, and heat. Examples 14A and 14B of Table III did not give vulcanized products, thus demonstrating the advantage of vulcanizable unsaturation in the polymer.

This invention is a valuable advance in the art as it extends the range of known rubber substitutes, giving new substitutes for rubber which have, in some respects, advantages over rubber. Furthermore, the synthetic rubbers described herein can be made almost entirely—through lactic acid as an intermediate—from carbohydrates, an abundant, domestic and reproducible raw material. The source of the small amount of polyolefinic hydrocarbon used in making the copolymer is relatively unimportant because only small proportions are required and many types can be used. The synthetic rubbers made previously from acrylic esters and butadiene contain large proportions of butadiene and, hence, are essentially butadiene products. Moreover, it is reported that these synthetic rubbers are unsatisfactory. Our products are essentially alkyl acrylate polymers which can be vulcanized by virtue of a small amount of unsaturation. Vulcanization or cross-linkage of our unsaturated copolymers can be effected by treatment with sulfur or non-sulfur recipes, such as benzoyl peroxide, and by other methods.

Various emulsifiers may be used in place of those shown herein and various peroxides and percompounds may be used as catalysts to initiate percompounds may be used as catalysts to initiate the polymerization. Furthermore, various amounts and combinations of vulcanizing agents, vulcanizing accelerators, pigments, fillers, extenders, and modifiers may be used in compounding the acrylic resins herein described prior to vulcanization.

Moreover, different types of reinforcing agents and accelerators may be employed and these agents may be milled into the copolymer or added to the emulsion or solution of the copolymer.

In the following tables, the various alphabetical characters, when they appear alone, have the following significance:

A=Mercaptobenzothiazole
B=Carbon black
C=Stearic acid
D=Zinc oxide
E=Tetramethylthiuram disulfide
F=Sulfur
G=N-cyclohexyl-2-benzothiazole sulfenamide
H=Reaction product of carbon disulfide and methylene-dipiperidine
I=Selenium diethyldithiocarbamate
J=Purified mercaptobenzothiazole
K=Zinc dibutyl-dithiocarbamate
L=23% benzoyl peroxide
M=Iron oxide
N=Coated calcium carbonate
O=Red lead
P=Lead peroxide
Q=Quinone dioxime
R=Quinone dioxime dibenzoate

TABLE I

*Polymerization of mixtures of methyl acrylate, acrylonitrile, and butadiene*

| Example No. | Monomers (grams) Methyl Acrylate | Monomers (grams) Acrylonitrile | Monomers (grams) Butadiene | Octyl sodium sulfosuccinate, g. | Sodium Oleate, g. | Rennet Casein, g. | Lecithin, g. | n-Amyl alcohol, ml. | Water, ml. | Benzoyl Peroxide (catalyst), g. | Other Components | Temp., °C. | Time, Hrs. | Properties |
|---|---|---|---|---|---|---|---|---|---|---|---|---|---|---|
| 1 [a] | 14.25 | 0.0 | 0.75 | 0.5 | 0.5 | 0.5 | 0.5 | ---- | 60 | 0.15 | ---- | 40 / 60 | 18 / 4 | Hard and tough. |
| 2 [a] | 14.25 | 1.0 | 0.75 | 0.5 | 0.5 | 0.5 | 0.5 | ---- | 60 | 0.15 | ---- | 40 / 55 | 18 / 4 | Elastic and strong. |
| 3 [a] | 15.1 | 0.0 | 1.6 | 1.0 | 0.5 | 1.5 | ---- | 0.25 | 115 | 0.17 | gum tragacanth, 0.1 g. | ---- | ---- | Hard and tough. |
| 4 [a] | 60.2 | 8.0 | 4.8 | 2.0 | 2.0 | 2.0 | 2.0 | ---- | 240 | 0.6 | ---- | 45 | 18 | Rubbery. |
| 5 [a] | 45.0 | 2.5 | 2.5 | 2.0 | 2.0 | 1.0 | ---- | ---- | 210 | 0.22 | starch derivative, 2.0 g.[b] | 40 | 22 | Do. |
| 6 [c] | 31.5 | 1.75 | 1.75 | ---- | ---- | ---- | ---- | ---- | ---- | 1.15 | Ethyl acetate, 140 ml. | ---- | ---- | ---- |
| 7 [d] | 9.0 | 0.5 | 0.5 | ---- | ---- | ---- | ---- | ---- | ---- | 0.04 | ---- | 55 | 24 | Rubbery, good retraction. |
| 8 [a] | 55.0 | 1.5 | 3.0 | 2.0 | 2.0 | 1.0 | ---- | ---- | 210 | 0.3 | Starch derivative, 2.0 [b] | ---- | ---- | Very rubbery. |
| 9 [a] | 45.0 | 1.5 | 5.0 | 1.5 | 1.5 | ---- | ---- | ---- | 180 | ---- | ---- | 60 | ---- | Rubbery. |
| 10 [e] | 100.0 | 10.0 | 25.0 | 4.0 | 4.0 | 4.0 | ---- | ---- | 470 | 1.05 | ---- | 55 | 24 | Quite rubbery, bounces. |
| 11 [d] | 60.0 | 0.0 | 22.2 | 2.0 | 2.0 | 2.0 | ---- | ---- | 310 | 0.6 | ---- | 60 | 22 | Tough, not rubbery. |
| 12 [d] | 40.0 | 2.0 | 6.0 | 1.0 | 1.0 | 1.0 | ---- | ---- | 130 | 0.8 | ---- | 85 | 2 | Soft and rubbery. |

[a] Polymerized in rotating bottle located in oven.
[b] Product prepared from starch and chloroethyl ether.
[c] Polymerized (solution) in a three-neck flask (stirring).
[d] Polymerized in a sealed tube.
[e] Polymerized in a glass-lined rotating bomb.

TABLE II

*Polymerization of acrylic esters in the presence of diene monomers*

| Example No. | Monomers in grams Methyl Acrylate | Ethyl Acrylate | Butyl Acrylate | Acrylonitrile | Isoprene | Butadiene | Cetyl trimethyl benzyl ammonium chloride, g. | Water, ml. | Time | Catalyst |
|---|---|---|---|---|---|---|---|---|---|---|
| 13 | ---- | 98 | ---- | ---- | ---- | 2 | 2.0 | 150 | 210 min | Benzoyl peroxide (2 g.), 30% H$_2$O$_2$ (14 ml.). |
| 14 | ---- | 250 | ---- | ---- | ---- | ---- | 4.0 | 300 | 20 min | 30% H$_2$O$_2$ (0.5 ml.). |
| 15 [a] | ---- | 380 | ---- | ---- | 20 | ---- | ---- | ---- | 130 min | Benzoyl peroxide (10 g.). |
| 16 | 70 | ---- | ---- | 3 | ---- | ---- | 13.5 | 250 | 26 hrs | Benzoyl peroxide (0.7 g.). |
| 17 | ---- | 380 | ---- | ---- | 20 | ---- | (b) | ---- | 180 min | Benzoyl peroxide (15 g.). |
| 18 | 60 | ---- | 30 | 5 | 5 | ---- | 2.5 | 400 | 1,000 min | Na Perborate (6 g.), Benzoyl peroxide (8 g.). |
| 19 | 60 | ---- | 30 | 5 | 5 | ---- | 2.5 | 400 | 300 min | Benzoyl peroxide (4 g.). |

[a] Mass polymerization.
[b] Emulsifying agents were 2 g. octyl sodium sulfosuccinate, 2 g. sodium oleate, and 2 g. casein.

Some of the materials referred to in Tables I and II have the composition and function listed below:

| Composition | Function |
|---|---|
| Octyl sodium sulfosuccinate | Emulsifier. |
| Cetyl trimethyl benzyl ammonium chloride. | Do. |
| Alkyd resins prepared from glycols and dibasic acids such as sebacic acid and succinic acid. | Rubbery polymer used as blending agent. |
| Lecithin | Thickener and stabilizer. |
| n-Amyl alcohol | Anti-foaming agent. |
| Gum tragacanth | Thickener and stabilizer. |
| Beta, beta-dichloroethyl ether derivative of starch. | Do. |
| Ethyl acetate | Solvent. |

TABLE III

*Vulcanization of copolymers of Table II*

| Example No. | Compounding Formula in g. per 100 g. of Copolymer | | | | | | Vulcanization | |
|---|---|---|---|---|---|---|---|---|
| | A | B | C | D | E | F | Time, min. | Temp., °F. |
| 13 | .5 | 30.0 | 2.0 | 5.0 | 1.0 | 2.0 | 80 | 298 |
| 14A | .5 | 30.0 | 2.0 | 5.0 | 1.0 | 2.0 | 80 | 298 |
| 14B [1] | ---- | ---- | ---- | ---- | 5.0 | ---- | 360 | 122 |
| 15 | .5 | 30.0 | 2.0 | 5.0 | 1.0 | 2.0 | 110 | 298 |
| 16 | .5 | 30.0 | 2.0 | 5.0 | 2.0 | 2.0 | 120 | 274 |
| 17 | .5 | 30.0 | 2.0 | 5.0 | 1.0 | 2.0 | 110 | 298 |
| 18 | .5 | 30.0 | 2.0 | 5.0 | 1.0 | 2.0 | ---- | ---- |
| 19 | .5 | 30.0 | 2.0 | 5.0 | 1.0 | 2.0 | ---- | ---- |

[1] 95 g. of copolymer used instead of 100 g.

TABLE IV
Preparation of diene-ethyl acrylate copolymers

| Example No. | Ethyl Acrylate, g. | Acrylonitrile, g. | Diene Comonomer, g. | | Alkyl sodium Sulfate (Emulsifier), g. | Dodecyl Mercaptan ml. | Water, ml. | Ammonium Persulfate (Catalyst), g. | Temp. °C. | Time, Hours | Yield of Copolymer, percent |
|---|---|---|---|---|---|---|---|---|---|---|---|
| 20 | 97.9 | | Isoprene | 2.1 | 3.0 | | 300 | 0.130 | 82–92 | 5/6 | 95.5 |
| 21 | 91.9 | 6.0 | do | 2.1 | 3.0 | | 300 | 0.090 | 82–92 | 1 2/3 | 91.0 |
| 22 | 91.9 | 6.0 | do | 2.1 | 3.0 | 0.10 | 300 | 0.090 | 82–92 | 1 1/2 | 92.0 |
| 23 | 89.8 | 6.0 | do | 4.2 | 3.0 | 0.10 | 300 | 0.100 | 82–92 | 1 2/3 | 77.0 |
| 24 | 85.6 | 6.0 | do | 8.4 | 3.0 | 0.10 | 300 | 0.140 | 82–92 | 2 1/4 | 85.0 |
| 25 | 1,100.0 | 72.0 | do | 25.2 | 36.0 | | 2,000 | 1.300 | 82–92 | 3 1/2 | 95.0 |
| 26 | 1,100.0 | 72.0 | do | 25.2 | 36.0 | | 2,000 | 1.100 | 65–90 | | 87.0 |
| 27 | 97.9 | | Piperylene | 2.1 | 3.0 | | 300 | 0.100 | 82–92 | 2 1/6 | 97.0 |
| 28 | 91.9 | 6.0 | do | 2.1 | 3.0 | | 300 | 0.060 | 82–92 | 1 1/2 | 91.0 |
| 29 | 91.9 | 6.0 | do | 2.1 | 3.0 | 0.10 | 300 | 0.080 | 82–92 | 1 1/4 | 94.0 |
| 30 | 89.8 | 6.0 | do | 4.2 | 3.0 | 0.10 | 300 | 0.090 | 82–92 | 1 3/4 | 91.0 |
| 31 | 91.9 | 6.0 | do | 2.1 | 3.0 | | 300 | 0.075 | 82–92 | 5 3/4 | 77.0 |
| 32 | 91.9 | 9.3 | do | 2.1 | 3.0 | | 300 | 0.050 | 82–92 | 2 1/2 | 87.5 |
| 33 | 735.0 | 48.0 | do | 16.8 | 24.0 | | 2,400 | 0.500 | 82–92 | 2 3/4 | 86.0 |
| 34 | 46.0 | 3.0 | Butadiene | 1.0 | 2.0 | | 150 | 0.050 | 75–77 | 5 | 50.0 |
| 35 | 46.0 | 3.0 | do | 1.0 | 2.0 | | 150 | 0.077 | 75–77 | 5 | 60.0 |
| 36 | 46.0 | 3.0 | do | 1.0 | 2.0 | | 150 | 0.110 | 75–77 | 5 | 70.0 |
| 37 | 46.0 | 3.0 | do | 1.0 | 2.0 | | 150 | 0.170 | 75–77 | 5 | 50.0 |
| 38 | 91.9 | 6.0 | Cyclopentadiene | 2.1 | 3.0 | | 300 | 0.040 | 82–92 | 1 2/3 | 94.0 |
| 39 | 97.9 | | Myrcene | 2.1 | 3.0 | | 300 | 0.080 | 82–92 | 3/4 | 89.0 |
| 40 | 91.9 | 6.0 | do | 2.1 | 3.0 | | 300 | 0.080 | 82–92 | 1 | 88.0 |
| 41 | 91.9 | 6.0 | do | 2.1 | 3.0 | 0.10 | 300 | 0.080 | 82–92 | 1 | 89.0 |
| 42 | 96.0 | | Divinylbenzene | 4.0 | 3.0 | | 300 | 0.030 | 79–91 | 1 3/4 | 95.0 |
| 43 | 90.0 | 6.0 | do | 4.0 | 3.0 | | 300 | 0.030 | 70–91 | 3 1/2 | 92.0 |
| 44 | 90.0 | 6.0 | do | 4.0 | 3.0 | 0.10 | 300 | 0.030 | 78–92 | 2 1/2 | 93.0 |

TABLE V
Vulcanization of copolymers of Table IV

| Example No. | Compounding Formula in parts per 100 parts of Copolymer | | | | | | Vulcanization | | Tensile Strength lbs./sq. in. | Ultimate Elongation, percent |
|---|---|---|---|---|---|---|---|---|---|---|
| | A | B | C | D | E | F | Time, min. | Temp. °F. | | |
| 20 | .5 | 30 | 2 | 5 | 1 | 2 | 120 | 298 | 630 | 730 |
| 21 | .5 | 30 | 2 | 5 | 1 | 2 | 120 | 298 | 1,130 | 680 |
| 22 | .5 | 30 | 2 | 5 | 1 | 2 | 120 | 298 | 990 | 750 |
| 23 | .5 | 30 | 2 | 5 | 1 | 2 | 120 | 298 | 1,200 | 370 |
| 24 | .5 | 30 | 2 | 5 | 1 | 2 | 60 | 298 | 1,190 | 210 |
| 25 | .5 | 30 | 2 | 5 | 1 | 2 | 180 | 298 | 1,190 | 550 |
| 26 | .5 | 30 | 2 | 5 | 1 | 2 | 180 | 298 | 840 | 560 |
| 27 | .5 | 30 | 2 | 5 | 1 | 2 | 60 | 298 | 820 | 780 |
| 28 | .5 | 30 | 2 | 5 | 1 | 2 | 180 | 298 | 1,110 | 910 |
| 29 | .5 | 30 | 2 | 5 | 1 | 2 | 120 | 298 | 510 | 1,020 |
| 30 | .5 | 30 | 2 | 5 | 1 | 2 | 60 | 298 | 670 | 640 |
| 31 | .5 | 30 | 2 | 5 | 1 | 2 | 60 | 298 | 920 | 770 |
| 32 | .5 | 30 | 2 | 5 | 1 | 2 | 60 | 298 | 940 | 830 |
| 33 | .5 | 30 | 2 | 5 | 1 | 2 | 120 | 298 | 1,020 | 590 |
| 34 | .5 | 30 | 2 | 5 | 1 | 2 | 180 | 298 | 1,280 | 270 |
| 35 | .5 | 30 | 2 | 5 | 1 | 2 | 120 | 298 | 1,240 | 290 |
| 36 | .5 | 30 | 2 | 5 | 1 | 2 | 120 | 298 | 1,160 | 280 |
| 37 | .5 | 30 | 2 | 5 | 1 | 2 | 120 | 298 | 1,090 | 280 |
| 38 | .5 | 30 | 2 | 5 | 1 | 2 | 180 | 298 | 490 | 1,540 |
| 39 | .5 | 30 | 2 | 5 | 1 | 2 | 180 | 298 | 430 | 310 |
| 40 | .5 | 30 | 2 | 5 | 1 | 2 | 60 | 298 | 810 | 530 |
| 41 | .5 | 30 | 2 | 5 | 1 | 2 | 180 | 298 | 780 | 460 |
| 42 | .5 | 30 | 2 | 5 | 1 | 2 | 180 | 298 | 210 | 1,080 |
| 43 | .5 | 30 | 2 | 5 | 1 | 2 | 180 | 298 | 920 | 420 |
| 44 | .5 | 30 | 2 | 5 | 1 | 2 | 180 | 298 | 560 | 500 |

TABLE VI
Preparation of acrylic copolymers

| Example No. | Ethyl Acrylate, g. | Acrylonitrile, g. | Comonomer, g. | | Alkyl Sodium Sulfate (Emulsifier), g. | Dodecyl Mercaptan, ml. | Water, ml. | Ammonium Persulfate (Catalyst), g. | Temp, °C. | Time, Hours | Yield of Copolymer, Percent |
|---|---|---|---|---|---|---|---|---|---|---|---|
| 45 | 318.5 | 21 | Allyl maleate | 10.5 | 7 | 0.35 | 1,050 | 0.03 | 82–92 | 5 | 86 |
| 46 | 318.5 | 21 | do | 10.5 | 7 | 0.35 | 1,050 | 0.03 | 82–92 | 5 | 86 |
| 47 | 318.5 | 21 | do | 10.5 | 7 | 0.35 | 1,050 | 0.03 | 82–92 | 5 | 86 |
| 48 | 318.5 | 21 | do | 10.5 | 7 | 0.35 | 1,050 | 0.03 | 82–92 | 5 | 86 |
| 49 | 735 | 48 | Piperylene | 16.8 | 24 | | 2,400 | 0.5 | 75–92 | 2.75 | 86 |
| 50 | 735 | 48 | do | 16.8 | 24 | | 2,400 | 0.5 | 75–92 | 2.75 | 86 |
| 51 | 735 | 48 | do | 16.8 | 24 | | 2,400 | 0.5 | 75–92 | 2.75 | 86 |
| 52 | 735 | 48 | do | 16.8 | 24 | | 2,400 | 0.5 | 75–92 | 2.75 | 86 |
| 53 | 1,100 | 72 | Isoprene | 25.2 | 36 | | 2,000 | 1.1 | 74–92 | 7 | 87 |
| 54 | 1,100 | 72 | do | 25.2 | 36 | | 2,000 | 1.1 | 74–92 | 7 | 87 |
| 55 | 1,100 | 72 | do | 25.2 | 36 | | 2,000 | 1.1 | 74–92 | 7 | 87 |
| 56 | 1,100 | 72 | do | 25.2 | 36 | | 2,000 | 1.1 | 74–92 | 7 | 87 |
| 57 | 1,100 | 72 | do | 25.2 | 36 | | 2,000 | 1.1 | 74–92 | 7 | 87 |
| 58 | 1,100 | 72 | do | 25.2 | 36 | | 2,000 | 1.1 | 74–92 | 7 | 87 |
| 59 | 1,100 | 72 | Isoprene | 25.2 | 36 | | 2,000 | 1.3 | 74–90 | 3.5 | 95 |
| 60 | 1,100 | 72 | do | 25.2 | 36 | | 2,000 | 1.3 | 74–90 | 3.5 | 95 |
| 61 | 1,100 | 72 | do | 25.2 | 36 | | 2,000 | 1.3 | 74–90 | 3.5 | 95 |
| 62 | 1,100 | 72 | do | 25.2 | 36 | | 2,000 | 1.3 | 74–90 | 3.5 | 95 |
| 63 | 1,100 | 72 | do | 25.2 | 36 | | 2,000 | 1.3 | 74–90 | 3.5 | 95 |
| 64 | 1,100 | 72 | do | 25.2 | 36 | | 2,000 | 1.3 | 74–90 | 3.5 | 95 |
| 65 | 1,100 | 72 | do | 25.2 | 36 | | 2,000 | 1.3 | 74–90 | 3.5 | 95 |
| 66 | 1,100 | 72 | do | 25.2 | 36 | | 2,000 | 1.3 | 74–90 | 3.5 | 95 |

NOTE.—In Examples 59–66, the mixture was heated at a lower temperature at the beginning of the polymerization.

TABLE VII
Vulcanization of acrylic copolymers of Table VI

| Example No. | A | B | C | D | E | F | G | H | I | J | K | L | M | N | O | P | Q | R | Time, min. | Temp., °F. | Tensile Strength, lb./sq. in. | Ultimate Elongation, Percent | Shore A Hardness |
|---|---|---|---|---|---|---|---|---|---|---|---|---|---|---|---|---|---|---|---|---|---|---|---|
| 45 |  | 60 | 3 | 5 |  |  |  |  |  |  |  |  |  | 10 |  |  |  | 6 | 120 | 298 | 1,050 | 360 | 81 |
| 46 |  | 60 | 3 | 5 |  |  |  |  |  |  |  |  |  | 10 |  |  | 2 |  | 180 | 298 | 1,380 | 300 | 84 |
| 47 |  | 60 | 3 | 5 |  |  |  |  |  |  |  |  |  |  |  | 6 | 2 |  | 180 | 298 | 1,010 | 420 | 73 |
| 48 | .5 | 30 | 2 | 5 | 1 | 2 |  |  |  |  |  |  |  |  |  |  |  |  | 180 | 298 | 850 | 770 | 55 |
| 49 | .5 | 30 | 2 | 5 | 1 | 2 |  |  |  |  |  |  |  |  |  |  |  |  | 120 | 298 | 1,020 | 590 | 62 |
| 50 |  | 60 | 3 | 5 |  |  |  |  |  |  |  |  |  | 10 |  |  | 2 |  | 240 | 298 | 1,570 | 190 | 88 |
| 51 |  | 30 | 3 | 5 |  |  |  |  |  |  |  |  |  | 10 |  |  | 2 |  | 120 | 298 | 910 | 420 | 57 |
| 52 |  | 45 | 3 | 5 |  |  |  |  |  |  |  |  |  | 10 |  |  |  |  | 120 | 298 | 1,340 | 380 | 73 |
| 53 | .5 | 30 | 2 | 5 |  |  | 3 | 2 |  |  |  |  |  |  |  |  |  |  | 120 | 298 | 830 | 610 | 51 |
| 54 | .5 | 30 | 2 | 5 |  |  | 3 |  | 2 |  |  |  |  |  |  |  |  |  | 180 | 298 | 940 | 670 | 55 |
| 55 | .5 | 30 | 3 | 5 | .75 | 1.5 |  |  |  |  |  |  |  |  |  |  |  |  | 180 | 298 | 1,160 | 520 | 50 |
| 56 |  | 30 | 2 | 5 | 1 | 1.5 |  |  |  | .75 |  |  |  |  |  |  |  |  | 90 | 298 | 810 | 530 | 49 |
| 57 [1] |  | 30 |  |  |  |  | 3 |  |  |  |  |  |  |  | .5 |  |  |  | 120 | 298 | 590 | 880 | 35 |
| 58 |  | 30 | 2 | 5 | 1 | 2 |  |  |  | .5 |  |  |  |  |  |  |  |  | 180 | 298 | 1,090 | 540 | 52 |
| 59 |  | 60 | 3 | 5 |  |  |  |  |  |  |  |  |  | 10 |  |  | 2 |  | 180 | 298 | 2,160 | 140 | 86 |
| 60 | .5 | 30 | 2 | 5 | 1 | 2 |  |  |  |  |  |  |  |  |  |  |  |  | 180 | 298 | 1,190 | 550 | 60 |
| 61 [2] |  |  |  |  |  |  |  |  |  |  | 5 | 150 |  |  |  |  |  |  |  | 298 | 1,030 | 460 | 61 |
| 62 | .5 | 30 | 2 | 5 |  | 2 |  |  | 1 |  |  |  |  |  |  |  |  |  | 240 | 298 | 1,120 | 490 | 57 |
| 63 | .5 | 20 | 2 | 5 | 1 | 2 |  |  |  |  |  |  | 20 |  |  |  |  |  | 120 | 298 | 1,060 | 570 | 60 |
| 64 [3] | .5 |  |  |  |  |  |  |  |  |  | 5 | 100 |  |  |  |  |  |  |  | 298 | 250 | 870 | 45 |
| 65 |  |  | 2 | 50 | 1 | 2 |  |  |  |  |  |  |  |  |  |  |  |  | 240 | 298 | 1,230 | 320 | 82 |
| 66 | .5 |  | 2 | 5 | 1 | 2 |  |  |  |  |  |  |  |  |  |  | 40 |  | 180 | 298 | 1,000 | 760 | 54 |

[1] Litharge (5 g.) used as an additional compounding ingredient.
[2] Heated for 20 min. at 210° F.
[3] Heated for 20 min. at 210° F.

Having thus described our invention, what is claimed is:

1. A process of preparing a synthetic rubber comprising heating a mixture containing, as monomeric components, an alkyl acrylate and an aliphatic dienic hydrocarbon in the proportion, by weight, of at least 80 percent of the acrylate to at least 1 percent of the dienic hydrocarbon, to effect copolymerization of said monomeric components, compounding the resulting copolymer with sulfur as a vulcanizing agent and heating the compounded mixture to effect vulcanization.

2. A process of preparing a synthetic rubber comprising heating a mixture containing, as monomeric components, an alkyl acrylate and an aliphatic dienic hydrocarbon in the proportion, by weight, of at least 80 percent of the acrylate to at least 1 percent of the dienic hydrocarbon, in the presence of acrylonitrile as a polymerization regulator adapted to retard cross-linkage, to effect copolymerization of said monomeric components, compounding the resulting copolymer with sulfur as a vulcanizing agent, and heating the compounded mixture to effect vulcanization.

3. A process of preparing a synthetic rubber comprising heating a mixture containing, as monomeric components, methyl acrylate and butadiene in the proportion, by weight, of at least 80% of the acrylate to at least 1 percent of the butadiene, in the presence of acrylonitrile as a polymerization regulator adapted to retard cross-linkage, to effect copolymerization of said monomeric components, compounding the resulting copolymer with sulfur as a vulcanizing agent, and heating the compounded mixture to effect vulcanization.

CHARLES H. FISHER.
WILLIAM C. MAST.

References Cited in the file of this patent

UNITED STATES PATENTS

| Number | Name | Date |
|---|---|---|
| 2,393,438 | Weisberg | Jan. 22, 1946 |
| 2,442,588 | D'Alelio | June 1, 1948 |

OTHER REFERENCES

India Rubber World, vol. 110, page 74, April 1944.